(12) United States Patent
Kautge et al.

(10) Patent No.: US 11,646,755 B2
(45) Date of Patent: May 9, 2023

(54) METHOD AND DEVICES FOR DETERMINING A FREQUENCY RANGE OF A SIGNAL TO BE TRANSMITTED

(71) Applicant: MOLEX CVS DABENDORF GMBH, Zossen (DE)

(72) Inventors: Helmut Kautge, Stahnsdorf (DE); Lars Lehmann, Wildau (DE); Helmut Nast, Berlin (DE); Ahmed Sayed, Berlin (DE); Josef Hecht, Erlangen (DE)

(73) Assignee: MOLEX CVS DABENDORF GMBH, Zossen (DE)

( * ) Notice: Subject to any disclaimer, the term of this patent is extended or adjusted under 35 U.S.C. 154(b) by 0 days.

(21) Appl. No.: 16/761,802

(22) PCT Filed: Nov. 6, 2018

(86) PCT No.: PCT/EP2018/080305
§ 371 (c)(1),
(2) Date: Dec. 22, 2020

(87) PCT Pub. No.: WO2019/086703
PCT Pub. Date: May 9, 2019

(65) Prior Publication Data
US 2021/0105028 A1    Apr. 8, 2021

(30) Foreign Application Priority Data

Nov. 6, 2017   (DE) .................... 10 2017 219 690.4

(51) Int. Cl.
*H04B 1/04*        (2006.01)
*H04B 17/382*      (2015.01)
*H04B 1/00*        (2006.01)

(52) U.S. Cl.
CPC .......... *H04B 1/0475* (2013.01); *H04B 1/006* (2013.01); *H04B 1/0483* (2013.01); *H04B 17/382* (2015.01)

(58) Field of Classification Search
CPC .... H04B 1/005; H04B 1/0053; H04B 1/0057; H04B 1/006; H04B 1/0473; H04B 1/0483;
(Continued)

(56) References Cited

U.S. PATENT DOCUMENTS 5,896,562 A    4/1999 Heinonen
5,915,212 A    6/1999 Przelomiec et al.
(Continued)

FOREIGN PATENT DOCUMENTS

CN    103856242 A    6/2014
CN    106255147 A    12/2016
(Continued)

OTHER PUBLICATIONS

International search report received for PCT application No. PCT/EP2018/080305, dated Feb. 12, 2019, 12 pages.
(Continued)

*Primary Examiner* — Young T. Tse

(57) ABSTRACT

Methods and devices are disclosed for amplifying radio signals between a terminal and an antenna or an antenna connection of a circuit having an amplification unit and a detector unit, which has signal branches designed for different frequency ranges, and a power detector. A transmission signal received by the terminal is divided into at least a first signal part and a second signal part. The first signal part is applied to the signal branches of the detector unit. A frequency range of the first signal part is determined by sequential application of the signal branches of the detector unit to the power detector for evaluating a power of the first
(Continued)

signal part. For the second signal part, the signal routing in the amplification unit is adjusted based on the frequency range determined by the detector unit. At least the second signal part is amplified by the amplification unit.

17 Claims, 8 Drawing Sheets

(58) Field of Classification Search
CPC ... H04B 1/40; H04B 1/44; H04B 1/50; H04B 3/46; H04B 3/48; H04B 3/548; H04B 3/56; H04B 17/10; H04B 17/13; H04B 17/382; H04B 2001/0408; H04B 2001/0416
USPC ....... 375/219, 220, 222, 260, 267, 285, 296, 375/297, 346, 349; 370/278, 280, 281, 370/282, 295–297; 455/78, 80, 82, 83, 455/114.3, 115.1, 127.1, 127.3, 129, 455/226.1
See application file for complete search history.

(56) References Cited

U.S. PATENT DOCUMENTS

| | | | |
|---|---|---|---|
| 6,243,563 | B1 | 6/2001 | Nakamura |
| 8,406,820 | B2 | 3/2013 | Nast |
| 2010/0195547 | A1* | 8/2010 | Vice ...................... H03F 1/0277 370/311 |
| 2011/0165848 | A1* | 7/2011 | Gorbachov .......... H04B 1/0064 455/78 |
| 2013/0257598 | A1 | 10/2013 | Kawaguchi et al. |
| 2014/0185707 | A1 | 7/2014 | Bollmann |
| 2015/0256272 | A1* | 9/2015 | Weissman ............... H03F 3/211 455/84 |
| 2016/0182165 | A1 | 6/2016 | Margon et al. |
| 2016/0381649 | A1* | 12/2016 | Anthony ................... H03F 3/24 455/127.2 |
| 2017/0214426 | A1* | 7/2017 | Nast ....................... H04B 1/406 |

FOREIGN PATENT DOCUMENTS

| | | |
|---|---|---|
| DE | 102006010963 A1 | 9/2007 |
| DE | 102009027358 A1 | 1/2011 |
| DE | 102014213933 A1 | 1/2016 |
| JP | 2000295120 A | 10/2000 |
| WO | 2008/054392 A1 | 5/2008 |
| WO | 2019/086703 A1 | 5/2019 |

OTHER PUBLICATIONS

First office action received for CN application No. 201880085529.4, dated Dec. 22, 2021, 15 pages (8 pages of English translation and 7 pages of official Notification).

* cited by examiner

METHOD AND DEVICES FOR DETERMINING A FREQUENCY RANGE OF A SIGNAL TO BE TRANSMITTED

RELATED CASES

This application is a National Phase of International Application No. PCT/EP2018/080305, filed on Nov. 6, 2018, which is incorporated herein by reference in its entirety and which claims the benefit of Germany Application No. 10 2017 219 690.4, filed Nov. 6, 2017.

BACKGROUND

The disclosure relates to a method for amplifying radio signals between a terminal and an antenna or an antenna connection, and to a circuit arrangement for carrying out such a method. In particular, the amplification serves to compensate for an attenuation of signal transmission occurring between the terminal and the antenna in the case of transmission and/or reception signals.

Such circuit arrangements are used, for example, in the operation of terminals, for example in the form of mobile telephones, in motor vehicles. The circuit arrangement is intended to improve the reception of the mobile telephone in the interior of the motor vehicle.

In an exemplary scenario, the mobile telephone is connected to an external antenna of the motor vehicle with the aid of the circuit arrangement and a high-frequency line. In this case, it is necessary to compensate for the attenuation of signal transmission between the mobile telephone and the external antenna of the motor vehicle. The mobile telephone can be connected to the external antenna in a wired as well as a wireless manner. In the case of the wired connection, the attenuation of the cable, the high-frequency line and possibly further components of the circuit arrangement or components connected thereto must be compensated. This attenuation is usually known and/or can be clearly determined. In addition, the attenuation that occurs at the air interface must be taken into account in the case of the wireless connection. This is usually variable and requires an adaptive adjustment of the amplification. An exemplary scenario is also conceivable in which it is the task of the circuit arrangement to amplify signals of the mobile telephone within the bounds of the power limits which the respective mobile radio standard provides.

Modern mobile phones typically support a variety of communication standards in different frequency ranges, such as the Global System for Mobile Communications (GSM), Universal Mobile Telecommunications System (UMTS), Long-Term Evolution (LTE), etc. that use different transmission methods. In order to be able to provide reliable operation using different communication standards, the circuit arrangement must support these different standards and/or carrier frequencies. This means that the circuit arrangement must provide specifically adapted amplifiers for the different frequency ranges. However, since activated amplifiers may interfere with the frequency range of another amplifier, it is usually necessary to amplify only the frequency range currently used by the terminal. In addition, power consumption is a further aspect. For this reason the amplifiers of the unused frequency ranges should not be activated. It can generally be said that preferably only the currently required amplifier paths are switched on in order to minimize circuit complexity, mutual interference and power consumption. It is also possible to disconnect the signal path or paths that are not required by corresponding upstream and/or downstream switches. For example, this means that when a transmission signal is detected in a specific frequency band, the corresponding transmission amplifier path will be connected, and the other signal paths will be disconnected and/or their amplifiers de-energized.

In order for the correct amplification circuit to be activated for the required frequency range, the circuit arrangement must therefore be able to detect the frequency range in which transmission is occurring, that is to say, which standard and/or which carrier frequency is being used. Only then can the circuit arrangement be configured for this frequency range. The frequency range is detected, for example, by detection units which analyze the signal to be amplified and then determine the corresponding frequency range. The circuit arrangement can then be configured on the basis of this determined frequency range, for example by switching respective signal branches which contain amplifiers for the corresponding frequency range. As a rule, a signal transmitted by the terminal is evaluated for the determination of the corresponding frequency range. The amplification circuits are then configured for both transmission mode and reception mode. In the case in which no transmission signal from the terminal is detected, no amplification of specific frequency ranges of transmission signals will take place either. Instead, in this case, all supported reception bands will preferably be amplified from the antenna towards the terminal when transmission paths are deactivated. This can be done, for example, with the aid of a preset amplification, possibly suitable for a plurality of frequency ranges. It is also conceivable to conduct the reception signals transparently, i.e. without amplification, from the antenna to the terminal.

The unexamined German patent application DE 10 2006 010 963 A1 describes a circuit arrangement which enables detection of a corresponding frequency range and an associated configuration of the amplification circuit. The detection takes place using a plurality of detectors which are designed for specific frequency ranges. In particular, separate detectors are used for GSM technology and for UMTS technology. However, the use of a plurality of detectors has the disadvantage, in particular in the case of multiband systems, that the circuit arrangement is of complex design and is less flexible for an expansion with regard to the detection of transmission signals of more recent radio standards.

In order to rectify this disadvantage, the unexamined German patent application DE 10 2009 027358 A1 proposes an introduction of a "polling mode" which is intended to reduce the circuitry complexity by using only a single detector. This polling mode enables different signal branches, which are designed for different frequency ranges, to be connected to the detector. This makes it possible to use only a single detector for all different frequency ranges, for example different mobile radio standards.

A decisive disadvantage of the polling mode described in this document, however, is that modern handover methods, such as inter-band handover or inter-frequency handover, are insufficiently supported. With such handovers, the mobile telephone changes to another frequency range, for example during ongoing communication. Modern mobile telephones are also able to switch between several communication standards, for example by a so-called inter-RAT handover (RAT=radio access technology) in which a change to another frequency band may also take place. Handover methods in which the mobile telephone changes to another frequency range during ongoing communication, for example, will be uniformly referred to below as "inter-band handover". The circuit arrangement disclosed in the unexamined German patent application cited, DE 10 2009 027 358 A1, is not suitable for this, since the detection unit permanently monitors a signal that has been found, but remains in the specific amplification configuration for as long as a usable signal is detected in the signal branch. A signal used by the mobile telephone in another frequency range is thus not recognized, or is only recognized very tardily.

Reliable operation of the circuit arrangement, however, presupposes a reliable determination of the active band, that is to say, of the frequency range. Accordingly, the circuit arrangement must be able to monitor and compare signal power levels continuously in the individual frequency ranges, that is to say, even during ongoing transmission. In practice, it has proven difficult for the circuit arrangement to detect a change of band during ongoing transmission, since the required frequency decoupling of the filters must be very extensive in this case. Alternatively, in the circuit arrangement of the unexamined German patent application DE 10 2009 027358 A1, it would first be necessary to introduce a separate detector unit for each frequency range, since evaluation by means of a single detector unit presupposes the ongoing continuation of the polling mode, which would however lead to an interruption of the signal transmission. However, the introduction of multiple detector units alone would not provide a sufficient solution since each switch interrupts the RF path, i.e. further conceptual rearrangements would be required. In addition, the provision of a plurality of detector units would in turn lead to undesired circuit complexity, as exists in document DE 10 2006 010 963 A1.

A further disadvantage of the above-mentioned circuit arrangement is that in the absence of a transmission signal, the various signal branches which correspond to different frequency ranges are switched through continuously, and synchronization with the starting time of the transmission signal is therefore impossible.

SUMMARY

The disclosure is accordingly based on the object of providing a circuit arrangement and a corresponding method for amplifying radio signals between a terminal and an antenna which recognize and support the aforementioned modern handover methods during ongoing operation without a substantial time delay. In particular, it is therefore possible to provide permanent monitoring of all the support frequency ranges without intervening in the ongoing amplification mode and without increasing circuitry complexity.

The object is achieved by the method and the circuitry of the independent claims. Advantageous embodiments are claimed in the dependent claims.

The method according to the disclosure for amplifying radio signals between a terminal and an antenna or an antenna connection by means of a circuit arrangement has an amplification unit and a detector unit which has signal branches configured for different frequency ranges and a power detector, and includes receiving a transmission signal from the terminal, dividing the transmission signal into at least one first signal part and a second signal part, applying the first signal part to the signal branches of the detector unit, determining a frequency range of the first signal part by sequentially applying the signal branches of the detector unit to the power detector in order to evaluate a power of the first signal part, adjusting the signal routing for the second signal part in the amplification unit based on the frequency range determined by the detector unit, and amplifying at least the second signal part using the amplification unit.

Due to the division into at least two signal parts, it is possible to arrange the detector unit independently of the amplification unit. A determination of the frequency range can thus be carried out with the aid of the detector unit during ongoing transmission, that is to say while the amplification unit is amplifying transmission and reception signals. This makes it possible for the terminal to perform handover methods, such as inter-band handover, with simultaneous optimal amplification by the circuit arrangement. In addition, it is therefore possible that, during amplification, interfering signals, which under certain circumstances crosscouple the useful frequency branches of the detector unit, and inter-band carrier aggregation of the terminal (two uplink signals in different frequency bands) can be detected. The use of only one detector unit is preferably sufficient for the arrangement according to the disclosure, i.e., circuit complexity, such as would arise with the use of a plurality of detector units, is avoided. The independence of the detector unit from the amplification unit also has the advantage that the detector unit can examine not only different frequency ranges but also a greater number of frequency ranges than the amplification unit is intended to amplify. A reliable determination of useful signals and interference signals can therefore take place.

The transmission signal of the terminal is preferably received via a radio interface. For this purpose, the circuit arrangement can have a signal-coupling device, that is to say a transmission unit, which receives wireless radio transmission signals of the terminal and couples them into a high-frequency line for further processing and/or outcouples reception signals of the terminal, which are received e.g. by the antenna of the automobile and conducted via a radio-frequency line and the circuit arrangement, for wireless transmission in the direction of the terminal. Dispensing with a wired connection between the terminal and the circuit arrangement, and therefore the antenna, enables greater spatial flexibility and additional comfort.

Alternatively, the terminal can also be connected to the circuit arrangement via a cable, which avoids interferences which occur in the case of a radio connection.

The splitting of the transmission signal preferably comprises splitting transmission signal power using at least one directional coupler or splitter.

The first signal part of the transmission signal of the terminal preferably has less power than the second signal part. Accordingly, only a small proportion of the power is used for the detection, and the second signal part can be forwarded to the amplification unit and/or the antenna without any major power loss. This therefore supports the transmission which lasts during the execution of the frequency range determination and offers advantages in the further processing of the radio-frequency signal, such as, for example, reduced component requirements for the amplifiers.

The signal branches configured for different frequency ranges preferably each have at least one bandpass filter. The use of the bandpass filters allows the signal to be filtered to the frequency range of the signal that is to be evaluated by the power detector.

The determined frequency range preferably corresponds to a frequency range of a radio standard, in particular a mobile radio standard and/or a standard for local wireless networks. Different standards or carrier frequencies can therefore be supported by different signal branches with different frequency ranges. Furthermore, new standards can be supplemented relatively easily by adding a further signal branch in the detection unit and an associated amplification circuit in the amplification unit, which are designed for the frequency range of the new standard.

The determination of a frequency range of the first signal part is preferably executed continuously. This makes it possible to react quickly to an incoming signal, since the determination is executed continuously.

Alternatively, the determination of a frequency range of the first signal part is started due to a triggering event. This can be take place, for example, due to a triggering event which corresponds to a transmission signal. For example, with the aid of the detection unit which is in its initial state in which the signal is transmitted in broadband, for example without a bandpass filter, the control unit recognizes that a threshold value of the transmission power has been exceeded, whereby the determination of the frequency range can begin. A temporal synchronization of the determination of the frequency range with the start of the transmission signal is therefore possible.

The signal branches of the detector unit configured for different frequency ranges preferably each include at least one or a common radio-frequency amplifier for dynamic expansion of the power measurement. It can also be provided that one or more of the signal branches each have at least one high-frequency amplifier, while two or more of the signal branches share a common radio-frequency amplifier. In any case, such a design enables a more reliable determination of the frequency range used.

Determining a frequency range of the first signal part preferably comprises comparing to a threshold power the signal power of at least one of the signals applied sequentially to the power detector. The threshold value comparison can be used to determine whether a signal is present in the frequency range and accordingly whether the amplification unit is to amplify this frequency range.

Alternatively or additionally, the determination of a frequency range of the first signal part comprises a comparison of the signal power of a first one of the signals applied sequentially to the power detector with at least one second one of the signals applied sequentially to the power detector. It is therefore possible for the circuit arrangement to determine the frequency range resulting from the signal branch with the maximum signal power.

The signals applied sequentially to the power detector are preferably each converted into a direct voltage. The comparison described above then preferably takes place with the aid of the converted signals and therefore simplifies the subsequent processing of the signals.

The adjustment of the signal routing for the second signal part in the amplification unit preferably comprises a switching of signal branches which have one or more amplifiers designed for the frequency range determined.

The amplifiers designed for different frequency ranges can be situated on different signal branches. The amplification unit can therefore be adjusted to the determined frequency range by simply switching the signal branch. This design as various switchable signal branches also has the advantage that the circuit can easily incorporate new signal branches which in turn cover new frequency ranges.

Not only signals transmitted by the terminal but also signals received from the antenna are preferably amplified by means of the amplification unit.

The circuit arrangement therefore also allows the signals received at the antenna in the determined frequency range to be amplified. In particular, transmission methods can be supported according to a TDD (Time Division Duplex) or FDD (Frequency Division Duplex) method, wherein in the TDD methods, only transmission or reception signals are amplified at one point in time, whereas in the FDD methods, transmission and reception signals are amplified simultaneously.

The amplification of at least the second signal part by means of the amplification unit is preferably designed such that an attenuation of the signal transmission between the terminal and the antenna is compensated. The circuit arrangement can therefore take into account the fact that the terminal is not outside, but rather lies in the interior of a motor vehicle and is coupled to an external antenna.

The method according to the disclosure is preferably further designed to include, after adjustment of the signal routing for the second signal part in the amplification unit and when amplifying at least the second signal part with the aid of the amplification unit, dividing the other transmission signal into at least a first other signal part and a second other signal part, applying the first other signal part to at least one signal branch of the signal branches of the detector unit, and determining a frequency range of the first other signal part by sequentially applying the at least one signal branch of the detector unit to the power detector for evaluating a power of the first other signal part. All or only a subset of the existing signal branches and accordingly a subset of frequency ranges can be used for the evaluation. The frequency ranges to be analyzed can be selected when they are applied to the signal branches, when they are applied to the power detector, or both. Accordingly, depending on the situation, for example depending on the currently set amplification, different frequency ranges can be used for the detection.

The detector unit is accordingly able to carry out handover methods, such as inter-band handover, inter-frequency handover or inter-RAT handover, with simultaneous optimal amplification by the circuit arrangement. In particular, the ongoing transmission is not interrupted by the continuous frequency range determination by the detector unit. In addition, it is therefore possible for interference signals, which may in some circumstances cross-couple the useful frequency branches of the detector unit, and inter-band carrier aggregation of the terminal (two uplink signals in different frequency bands) to be detected.

The sequential application of the signal branches of the detector unit is preferably carried out by switching the signal branches of the detector unit to the power detector. This ensures that in each case only one signal branch is present at the power detector for evaluation.

Furthermore, in a preferred design, it is possible to detect interference signals. This is achieved in that the detector unit compares a power when a signal branch having at least one bandpass filter is applied with a power when a broadband signal branch is applied, preferably without a bandpass filter. Interference signals can be detected by the power detector having a significantly lower power level when the signal branch with bandpass filter is applied than when the signal branch is applied without a bandpass filter. This improves the accuracy of the executed determination of the frequency range.

The circuit arrangement according to the disclosure for amplifying radio signals between a terminal and an antenna has a transmission unit which is configured to receive a transmission signal from the terminal; a dividing means which is configured to divide the transmission signal into at least a first signal part and a second signal part; a detector unit that has a power detector for signal branches designed for different frequency ranges and is configured to apply the first signal part to the signal branches of the detector unit and to determine a frequency range of the first signal part by sequentially applying the signal branches of the detector unit to the power detector for evaluating a power of the first signal part; a control unit that is configured to adjust the signal routing for the second signal part in an amplification unit based on the frequency range determined by the detector unit; and an amplification unit that is configured to amplify at least the second signal part.

The circuit arrangement according to the disclosure makes it possible to achieve the advantages already explained with reference to the method.

BRIEF DESCRIPTION OF THE DRAWINGS

Further examples and embodiments are described below with reference to the drawing, in which.

DETAILED DESCRIPTION

Figure 1:
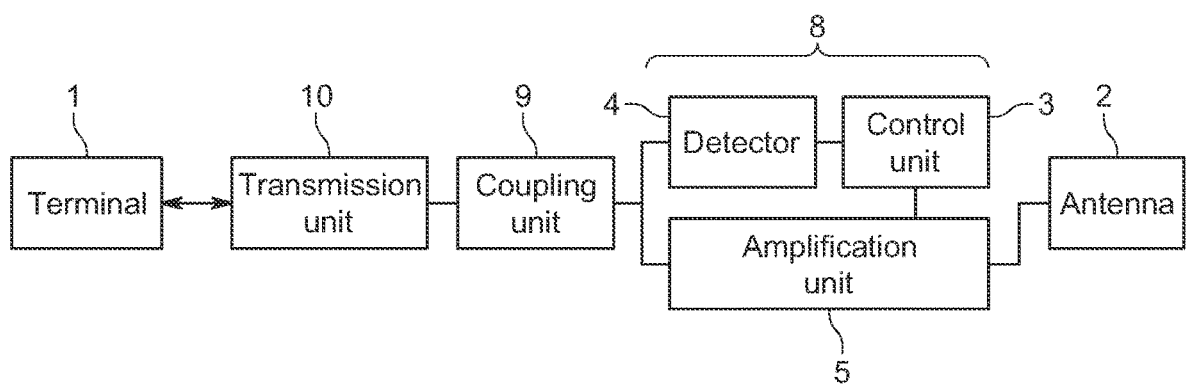
FIG. 1 shows a block diagram of a system of a circuit arrangement for amplifying radio signals between a terminal and an antenna according to an embodiment of the disclosure.

FIG. 1 shows a block diagram of a system showing a circuit arrangement for amplifying radio signals between a terminal and an antenna according to an embodiment of the disclosure.

The circuit arrangement 8 shown in FIG. 1 connects a terminal 1 to an antenna 2. The terminal 1 is preferably an electronic device capable of performing wireless communications, such as a mobile phone, a smartphone, a modem, or a radio module. The antenna 2 is, for example, an antenna externally mounted on a motor vehicle or an antenna connection. The terminal 1 and the antenna 2 themselves are not part of the circuit arrangement.

The circuit arrangement 8 serves to amplify the signals transmitted by the terminal 1, also called transmission signals, and/or the signals received by the antenna 2, also called reception signals. The amplification of the circuit arrangement 8 can in this case be designed such that it compensates for the attenuation of the signal power between the antenna 2 and the terminal 1.

The circuit arrangement 8 preferably comprises a detector unit 4, an amplification unit 5 and a control unit 3. The detector unit 4 serves for determining the frequency range to be amplified. The control unit 3 enables the configuration, if applicable the adjustment, of the amplification circuit based on the frequency range determined by the detector unit 4, and the amplification unit 5 amplifies signals in the determined frequency band, for example, in the FDD method transmission and reception signals simultaneously.

The circuit arrangement 8 preferably receives the transmission signals of the terminal for line-based further processing by means of the circuit arrangement with the aid of a transmission unit 10, and transmits the reception signals of the antenna 2 to the terminal 1 after further processing by the circuit arrangement. The transmission unit 10 does not necessarily form part of the circuit arrangement.

In the transmission signal direction, the transmission unit 10 is connected to a coupling unit 9 which is used to divide the transmission signal of the terminal into (at least) a first signal part and a second signal part, and to supply the first signal part to the detector unit 4 and the second signal part to the amplification unit 5. The circuit arrangement 8 can furthermore be designed in such a way that reception signals of the antenna 2 are also routed via the coupling unit 9.

The amplification unit 5 is preferably designed to amplify both reception and transmission signals. In the preferred embodiment, however, the frequency range is detected with the aid of the transmission signals.

Figure 2:
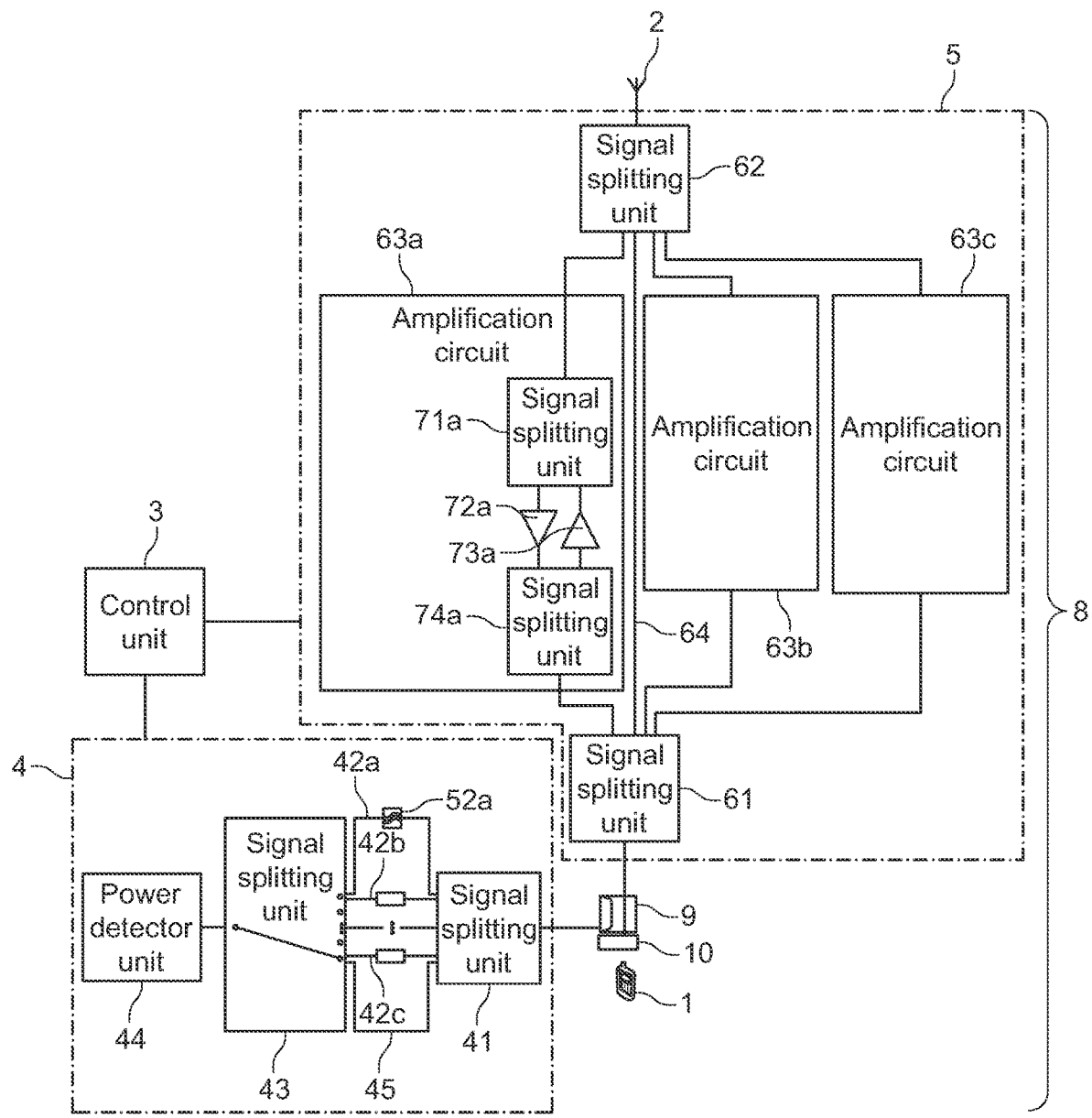
FIG. 2 shows a detailed circuit arrangement for amplifying radio signals between a terminal and an antenna according to an embodiment of the disclosure.

FIG. 2 shows a detailed circuit arrangement for amplifying radio signals between a terminal and an antenna according to an embodiment of the disclosure.

The detailed illustration of the circuit arrangement 8 comprises a detector unit 4, an amplification unit 5, a transmission unit 10, a coupling unit 9 and a control unit 3. The control unit 3 is shown as an independent unit, but it can also form a control and detector unit with the detector unit 4, however.

As already mentioned above, the transmission unit 10 forms the interface to the terminal, and the coupling unit 9 serves to divide a transmission signal of the terminal into a first signal part and a second signal part and to supply the first signal part to the detector unit 4 and the second signal part to the amplification unit 5.

The embodiment illustrated in FIG. 2 shows a division of the received transmission signal into a first signal part and a second signal part by means of a coupler.

The transmission signal received from the terminal can be received at the transmission unit 10 either via a radio interface or a cable. Dispensing with a wired connection between the terminal and the circuit arrangement and therefore the antenna allows a plurality of terminals to be supported without a uniform cable interface, as well as greater spatial flexibility and additional comfort. Accordingly, when entering the motor vehicle, the user does not need to first connect the terminal to the external antenna with the aid of a cable, but rather can use it without further intervention due to the wireless technology. A cable has the advantage, in turn, that interference which can occur on the radio interface is avoided.

The coupling unit 9 comprises, for example, a directional coupler or splitter. More than one coupler can also be used to outcouple signal parts which can then be supplied to different signal branches in order to determine a frequency range in the detector unit. The embodiment shown in FIG. 2 includes only one coupler.

The coupling unit 9 enables an outcoupling, wherein the first signal part of the transmission signal of the terminal may preferably have a lower power than the second signal part. Accordingly, only a small proportion of the power is used for the detection, and the second signal part can be forwarded to the amplification unit and/or the antenna without any major power loss. This therefore supports ongoing transmission during the performance of the frequency range determination.

As already mentioned above, the first signal part is routed to the detector unit 4. This comprises, for example, a first signal splitting unit 41 (such as a switch, power splitter or diplexer) which routes the first signal part to different signal branches 42a to 42c, and possibly to signal branch 45. The signal branches 42a to 42c are each designed for different frequency ranges and/or different transmission methods. The signal branch 45 can, if present, be designed broadband.

The different frequency ranges correspond, for example, to the frequency ranges of different radio standards. Such radio standards can in particular be mobile radio standards and/or standards for local wireless networks. Different frequency ranges can also cover different carrier frequencies of a same standard.

In the present embodiment, three different signal branches 42a to 42c are shown. However, fewer or more than three signal branches can be used, depending on how many different frequency ranges the circuit arrangement is intended to support. New frequency ranges, such as may occur when new radio standards are introduced, can easily be supplemented by adding a further signal branch in the detection unit.

However, this additionally presupposes an addition of a corresponding amplification circuit in the amplification unit, as will be explained in detail later.

The number of signal branches 42a to 42c is independent of the number of frequency ranges to be amplified. For example, the number of frequency ranges to be detected may exceed that of the frequency ranges to be amplified.

A signal branch configured for a frequency range, such as signal branch 42a, may filter out the signal part in the frequency range for which it is designed, such as 900 or 1800 mHz. This can be done using a bandpass filter 52a.

The signal branches 42a to 42c are preferably connected to a power detector 44 via a second signal splitting unit 43, in particular a switch. If a switch is already being used for the supply of the first signal part as the first signal splitting unit 41, the signal branches 42a to 42c can also be connected to the power detector 44 via a second signal splitting unit 43 which is designed, for example, as a diplexer. It is crucial that the circuit arrangement provides means for switching the signal branches 42a to 42c. The second signal splitting unit 43 (or the first signal splitting unit (switch) 41 in combination with the second signal splitting unit (diplexer) 43) sequentially applies the different signal branches 42a to 42c to the power detector. The sequential application can be performed periodically or be controlled by an event. In each case only the signal part of a signal branch is therefore fed to the power detector 44. The other signal branches are not connected to the power detector 44 at this moment. This rotation of the different signal branches makes it possible to use only one power detector for a plurality of signal branches. The circuit complexity can therefore be reduced and components saved.

If a switch and not for example a frequency divider has been used as the first signal splitting unit 41 when the first signal part is applied to the different signal branches, it must be ensured that this is switched synchronously with the switch that is used in the second signal splitting unit 43 (hereinafter also for short: switch 43). This is necessary in order to ensure a closed signal path between the coupling unit 9 and the receiver of the signal transmitted by the terminal and the power detector 44.

The determination of a frequency range of the first signal part can be carried out continuously or started by a triggering event. Accordingly, the switch 43 can either continuously switch through the individual signal branches or start switching only with the input of a triggering event.

Continuously switching through the individual signal branches has the advantage that it is possible to react quickly to an incoming signal without having to wait for a corresponding triggering event. However, the use of a triggering event in turn has the advantage that a temporal synchronization of the determination of the frequency range with the start of the transmission signal becomes possible.

Such a triggering event can be implemented by a power detector determining whether a transmission signal has been received by a terminal. This can be done in that, during operation in which no transmission signal is received, the switch 43 is switched to a transmission branch 45 which is not designed for a specific frequency range, but is dimensioned at least to be broadband enough for all supported transmission frequency ranges to be transmitted to the power detector 44. For this purpose, contrary to the signal branches 42a to 42c that are each configured for a specific frequency range, the transmission branch 45 may not have a bandpass filter, or may have a bandpass filter which is designed to let through frequencies of all frequency ranges (useful bands) to be evaluated.

In a next step, the power detector 44 can then convert the signal received by the different signal branches into a direct current (DC) voltage signal, which enables a simple evaluation and an easy comparison with other values, such as a threshold value.

The power detector 44 forwards the converted signal to the control unit 3 which can then analyze the signal. Then by using this signal, the control unit 3 can determine the corresponding frequency range or, if the signal has been routed via the signal path 45, the presence of a signal.

This can be done either by comparing the signal received at the control unit 3 with a threshold value and/or with previously detected values. The comparison with previously detected values presupposes that these values have been stored. For example, the last detected values of each signal branch can be stored. By the comparison with previously detected values, the frequency range containing the highest signal power can be determined and amplified. This is particularly advantageous when signal power is also present in frequency ranges that do not correspond to the carrier frequency of the transmitted transmission signal but instead result from noise, interference or the like. Preferably, such interference signals are detected by comparing a power for an applied signal branch having at least one bandpass filter with a power for an applied broadband signal branch. Interference signals can be detected by the power detector having a significantly lower power level when the signal branch with bandpass filter is applied than when the signal branch is applied without a bandpass filter.

In various embodiments, a plurality of frequency ranges may also be amplified if the signals of the corresponding signal branches are all above a predetermined threshold value.

In addition to determining the frequency range, the detector unit together with the control unit can be designed to measure the absolute signal power level as well as to analyze the signal time characteristic (continuously or in a time-discrete manner). For example, it can be determined for this purpose, e.g. with the aid of a comparator in the control unit 3, whether transmission signals are present above a threshold value, and if so, the time can be determined (e.g. microcontroller cycles) in which the transmission signal is present. From this, the duration and also the period of time-discrete signals (TDD) can be determined.

The time characteristic as well as the frequency range can be used to determine the radio standard. The power measurement, however, can serve for amplification adjustment and transmission power control.

On the basis of the determined frequency range or the determined frequency ranges, a signal routing can be adjusted which makes it possible to amplify the second signal part with the aid of the amplification unit. The time characteristic of the transmission signal determined by the detector unit can also be taken into account when adjusting the signal routing. This adjustment of the signal routing can be carried out, for example, by the control unit 3. For example, if the control unit 3 has determined that the frequency range corresponding to the signal branch 42*a* is being used and therefore is to be amplified, it may switch an associated amplification circuit such as the amplification circuit 63*a*. This switching can be effected by means of a signal splitting unit 61 for the signals transmitted from the terminal to the antenna and a further signal splitting unit 62 for the signals transmitted from the terminal to the antenna. The signal splitting units 61 and 62 each comprise, for example, one or more switches, couplers and/or diplexers. An amplification circuit, such as the amplification circuit 63*a*, may include further signal splitting units 71*a* and 74*a*, each having for example one or more switches, couplers, or diplexers, for dividing transmission signals and reception signals. However, the division into transmission signals and reception signals can also take place on a higher level for all or some amplification circuits. This means that the signal has already been divided into transmission signals and reception signals before it is routed to the corresponding amplification circuit. The amplification circuit 63*a* may further include a transmission amplifier 73*a* and a reception amplifier 72*a* designed for the specific frequency range of the amplification circuit. Accordingly, not only transmission signals but also reception signals are amplified in the determined frequency range. The exact design of the amplification circuit may differ depending on the employed standard and/or transmission method, such as the duplex method, e.g. frequency division duplex (FDD) or time division duplex (TDD). For example, the transmission amplifiers 73*a* and the reception amplifiers 72*a* can also be controlled by the control unit 3 (not shown in FIG. 2) via control lines, e.g. switched on or off or configured.

The modular design of the amplification circuits, which can be correspondingly controlled by the control unit 3, makes it possible to supplement further amplification circuits for additional frequency ranges or mobile radio standards without major effort.

Furthermore, the control unit 3 can control the amplification of the transmission amplifier 73*a* and/or the reception amplifier 72*a* corresponding to the power measurement performed by the detector unit.

In the case where no transmission signal is transmitted from the terminal to the antenna and accordingly no frequency range is determined, reception signals and/or transmission signals can in one embodiment be routed from the antenna to the terminal via the signal branch 64 which does not perform amplification. In another embodiment, in the case where no transmission signal is transmitted from the terminal to the antenna, all reception amplifier circuits may be active so that each supported reception frequency range is transmitted amplified to the terminal.

The amplification of at least the second signal part by means of the amplification unit can be designed such that an attenuation of the signal transmission between the terminal and the antenna is compensated. Accordingly, the circuit arrangement makes it possible to take into account the fact that the terminal is not outside, but is coupled to an external antenna in the interior of a motor vehicle. Alternatively, the amplification unit can also amplify the signal beyond the compensation and thereby bring about an expansion of the range by signal amplification.

Figure 3:
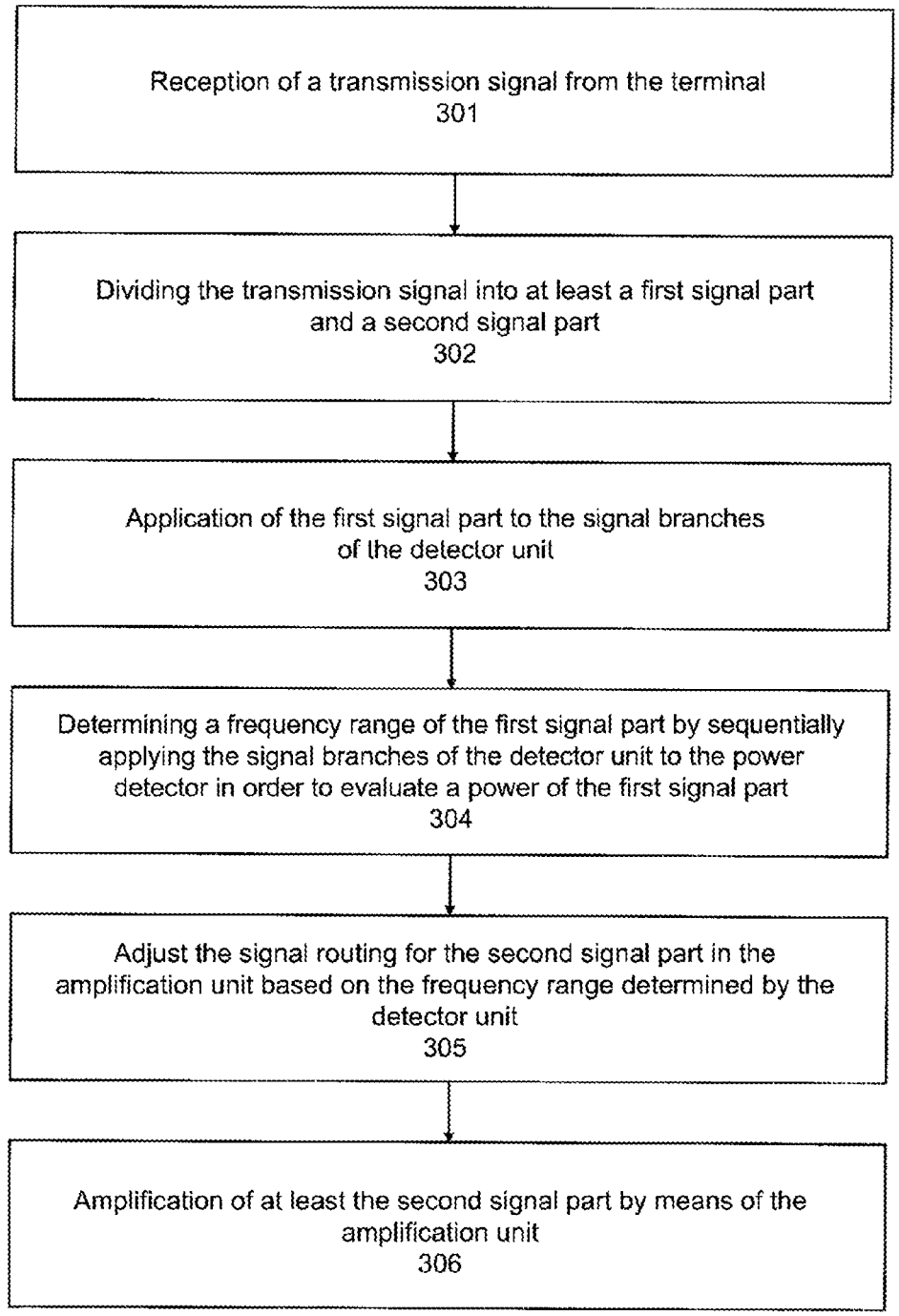
FIG. 3 shows a flow diagram of a method for amplifying radio signals between a terminal and an antenna according to an embodiment of the disclosure.

FIG. 3 shows a flow diagram of a method for amplifying radio signals between a terminal and an antenna according to one embodiment of the disclosure.

In step 301, a transmission signal from the terminal 1 is received at the circuit arrangement 8. This takes place, for example, via a cable or a radio interface. In step 302, this is followed by a division of the transmission signal into a first signal part and a second signal part. The division can be performed by a directional coupler, a splitter or some other component which can divide high-frequency signals in the power.

In step 303, the first signal part is then applied to signal branches of the detector unit which are designed for different frequency ranges. The first signal part can be applied to the different signal branches by means of a first signal splitting unit 41, for example by means of a switch (for example in combination with the second signal splitting unit 43, for example a diplexer or a power splitter), or by means of a first signal splitting unit 41 which is designed as a diplexer or power splitter (e.g. in combination with the second signal splitting unit 43 which is designed as a switch). In step 304, a frequency range of the first signal part is determined by sequentially applying the signal branches of the detector unit to the power detector. This sequential application can take place with the aid of the second signal splitting unit 43, in particular a switch. If the application of the first signal part to different signal branches was effected with the aid of a signal splitting unit 41 designed as a switch, the second signal splitting unit 43 designed as a switch, as already mentioned with reference to FIG. 2, will need to be switched synchronously with the switch 43. As explained in detail above, the frequency range can be determined by comparisons with threshold values or previously recorded powers.

Once the frequency range has been determined, the signal routing for the second signal part in the amplification unit may be adjusted based on the determined frequency range in step 305. This is done, for example, by switching signal branches which have amplifiers for the determined frequency range. Finally, in step 306, at least the second signal part is amplified by means of the amplification unit adjusted to the frequency range. For the sake of completeness, it should be noted that the frequency ranges of the signal branches 42*a*-42*c* do not have to correspond to the frequency ranges supported by the amplification unit. For example, it may be advantageous to install a greater number of signal branches of different frequency ranges in the detector unit 4. This makes it possible, for example, to ensure a precise determination of useful and interfering signals. The frequency ranges of the signal branches 42*a*-42*c* may also overlap.

Figure 4A:
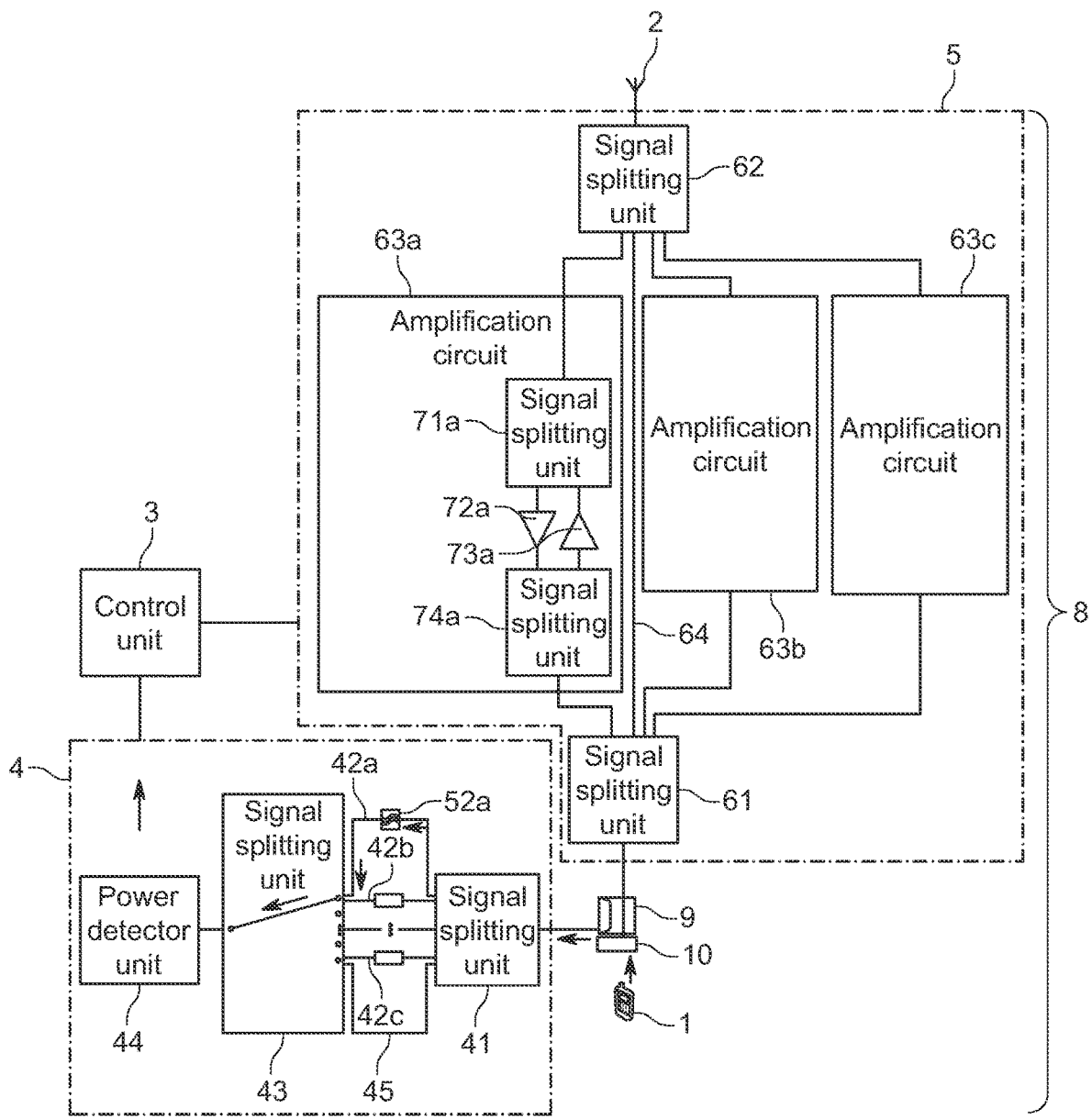
FIGS. 4a to 4c show the detailed circuit arrangement according to FIG. 2 for a determination of the frequency range and for an amplification within a determined frequency range.
Figure 4B:
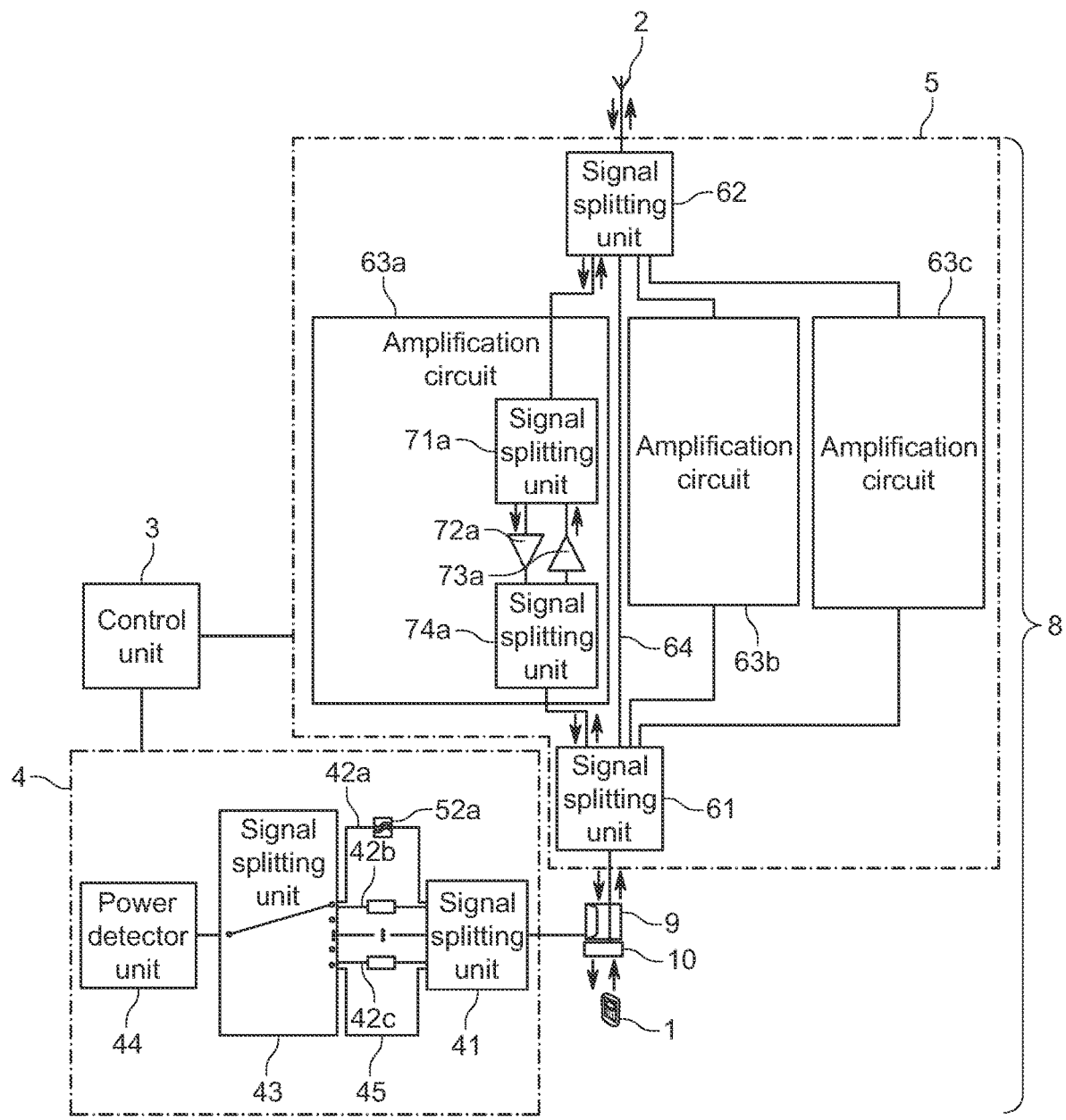
Figure 4C:
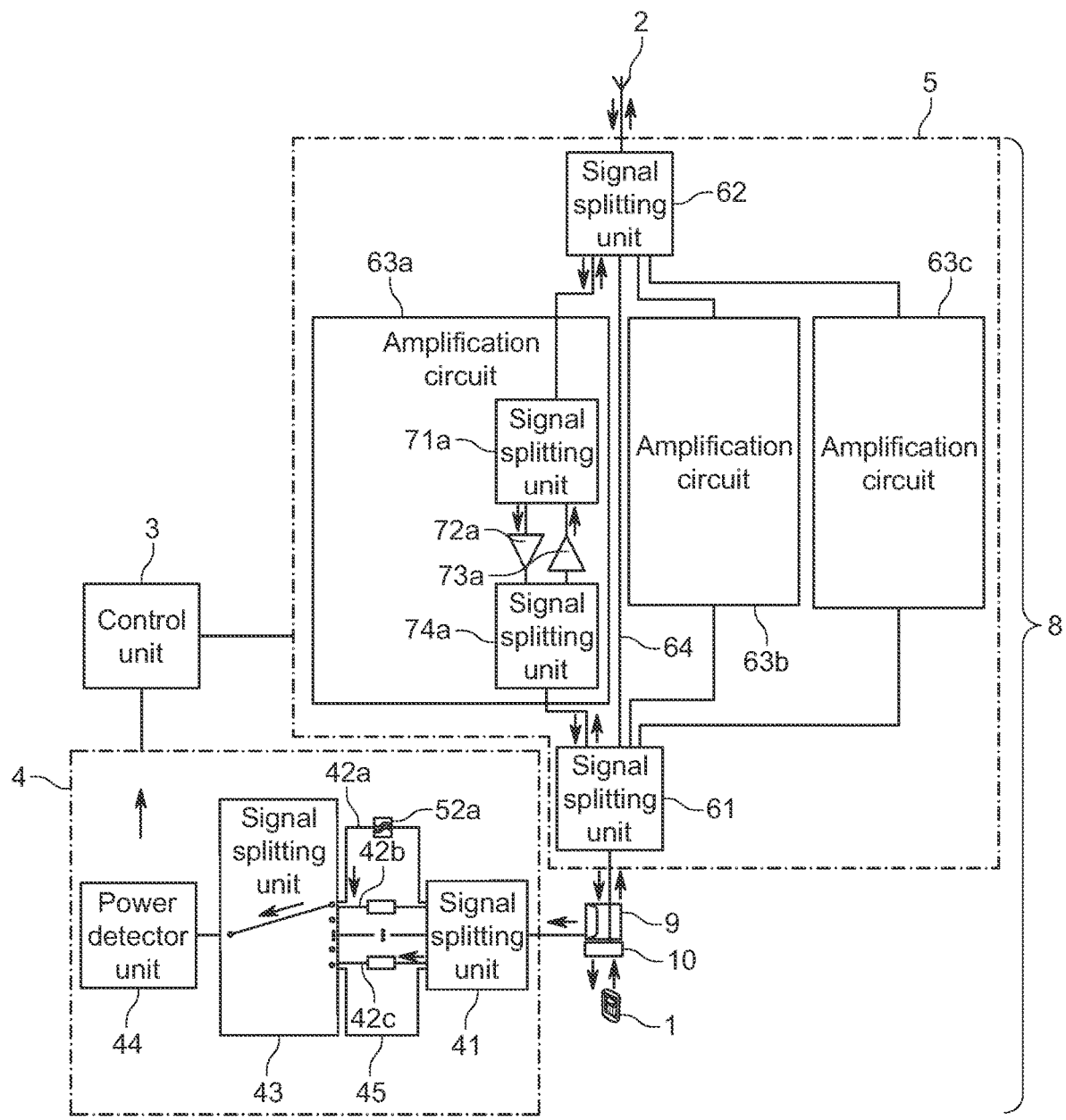

FIGS. 4*a* to 4*c* show the detailed circuit arrangement according to FIG. 2 for frequency range determination and for amplification in a determined frequency range.

In FIG. 4*a*, the frequency range is determined by the detector unit 4. The amplifier unit can remain unchanged while the frequency range is being determined by the detector unit 4. If, for example, no previously detected band is present, the reception amplifiers will preferably be active and remain active for the duration of determination. After a successful determination as shown in the figure, the signal branch 42*a* is traversed, which in this case is detected by the control unit 3 as the frequency range being used.

In FIG. 4b, the amplification circuit 63a belonging to the signal branch 42a is then applied with the aid of the control unit 3. Incoming transmission and reception signals are now amplified by the amplification circuit 63a (as occurs in an FDD-based transmission method).

As shown in FIG. 4c, the second signal splitting unit 43 (switch) can apply the different signal branches 42a to 42c sequentially to the power detector 44 during an ongoing transmission and amplification with the aid of the amplification circuit 63a. Similar to what is shown in FIG. 2, for example, the signal branch 42c could be applied to the power detector 44. Ongoing transmission accordingly does not prevent a simultaneous determination of a new frequency range. This is particularly relevant in cases in which, on account of an inter-band handover, the frequency range used changes during ongoing transmission or interfering signals arrive at the detector. In addition, this may be helpful in the case of an inter-band carrier aggregation of the terminal (two uplink signals in different frequency bands).

It is not necessary for all signal branches 42a to 42c to be applied to the power detector for detection performed simultaneously during amplification. Rather, it may be advantageous to take into account only a subset of different signal branches during the detection. For example, this subset may be limited to frequency ranges adjacent to the currently amplified frequency range, or frequency ranges otherwise associated therewith.

The interference signals are preferably detected by comparing the powers detected by the power detector 44 when the signal branches 42a to 42c are applied with the detected power when the signal branch 45 is applied. Useful signals can be recognized by the fact that the detected power levels are approximately the same or have a power difference that is known depending on the realized circuit. Interference signals can be detected by the fact that the power detector detects significantly lower power levels when signal branches 42a to 42c are applied than when signal branch 45 is applied, which is attributable to the filtering effect of the bandpass filters used in signal branches 42a to 42c. It may therefore be sufficient, for example, to determine the maximum power level from the power levels detected when the signal branches 42a to 42c are applied, and to compare this with the power level when signal branch 45 is applied. If this maximum power level is approximately the same as the power level when the signal branch 45 is applied, or if both deviate only by a power difference known depending on the realized circuit, the circuit arrangement can process the detected signal as a useful signal. On the other hand, if this maximum power level is significantly lower than the power level when the signal branch 45 is applied, or if both deviate by more than a power difference known depending on the realized circuit, the circuit arrangement can determine the detected signal to be an interference signal. Alternatively, it is also conceivable to compare all power levels when the signal branches 42a to 42c are applied with the power level when signal branch 45 is applied, in order to carry out the detection of interference or useful signals.

If a useful signal has been detected in a signal branch which has no direct reference to the frequency range currently being amplified, the control unit 3 can be configured to adjust the amplification unit 5 to the new frequency range. However, the control unit 3 can additionally use further parameters, such as the duration or the strength of the useful signal, for assessing whether a switchover is to be carried out. Furthermore, the control unit 3 can take into account evaluations of other frequency ranges. For example, the control unit 3 can determine whether a useful signal is still present in the frequency range to which the amplification unit 5 is currently set. If this is the case, an inter-band carrier aggregation of the terminal can be present, for example, and the control unit 3 can recognize this. If the amplification unit 5 is configured to amplify a plurality of frequency ranges simultaneously, for example by activating different amplification signal branches equipped with bandpass filters, the control unit 3 can configure the amplification unit 5 in such a way that a plurality of detected frequency ranges are amplified.

If, on the other hand, the amplification unit 5 is configured in such a way that it can amplify only one frequency range simultaneously, the control unit 3 must decide on a frequency range to be amplified. This can be done on the basis of different criteria. For example, a main frequency range may be also selected for amplification. In the example of 5G (fifth-generation mobile radio standard) in which there is also a 4G link in addition to 5G communication, the 4G connection may be prioritized and amplified since this may be required for connection to the base station.

Figure 5A:
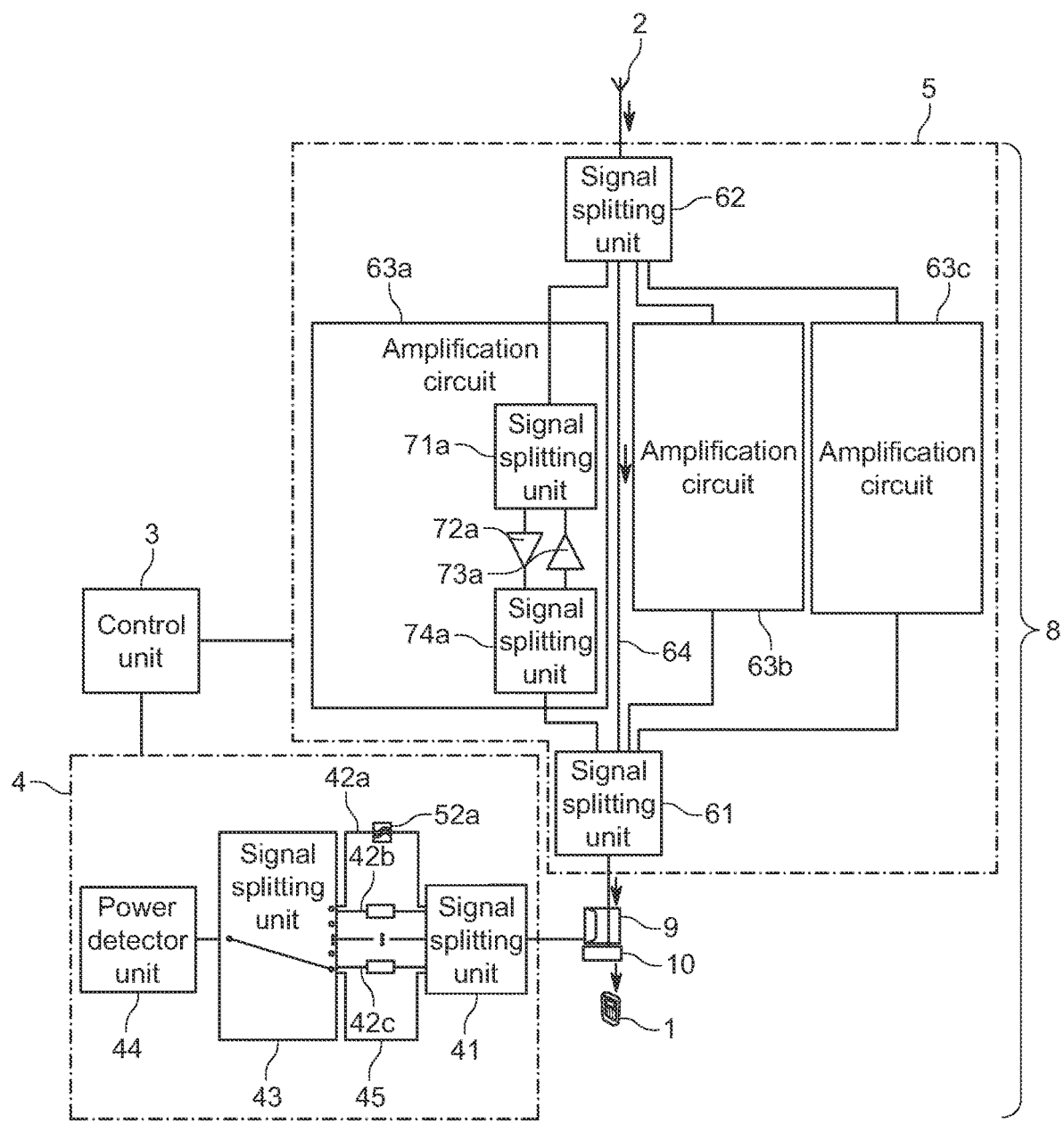
FIG. 5a shows the detailed circuit arrangement according to FIG. 2 for amplification in the absence of a transmission signal according to an embodiment of the disclosure.

FIG. 5a shows the detailed circuit arrangement FIG. 2 for amplification in the absence of a transmission signal according to one embodiment of the disclosure. According to this embodiment, no amplification of the reception signal is preferably carried out in the absence of a transmission signal and accordingly in the absence of a determined frequency range. In this case, the reception signal can be transmitted without amplification to the terminal 1 via the signal branch 64.

Figure 5B:
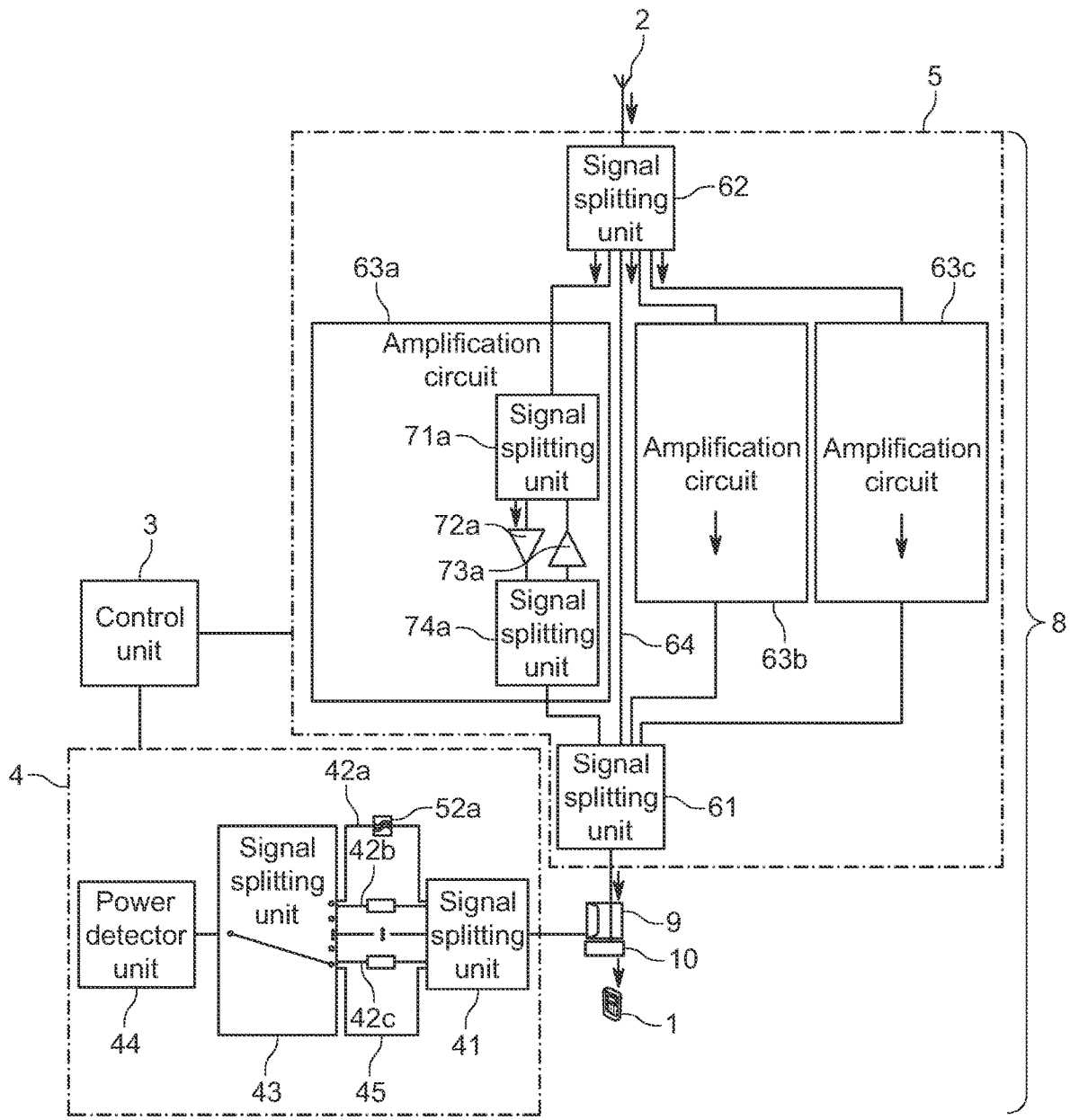
FIG. 5b shows the detailed circuit arrangement according to FIG. 2 for amplification in the absence of a transmission signal according to another embodiment of the disclosure.

FIG. 5b shows the detailed circuit arrangement according to FIG. 2 in the case of amplification in the absence of a transmission signal according to another embodiment of the disclosure. In this embodiment, all or at least several reception amplifiers may be active if no specific frequency range has been determined on the basis of a transmission signal. Accordingly, the reception signal can be amplified in all or a plurality of frequency ranges in which an amplification circuit is present.

The invention claimed is:

1. A method for amplifying radio signals between a terminal and an antenna or an antenna connection by a circuit, having an amplification unit and a detector unit which has signal branches designed for different frequency ranges, and a power detector, the method comprising:
receiving a transmission signal from the terminal;
dividing the transmission signal into at least a first signal part and a second signal part;
applying the first signal part to the signal branches of the detector unit;
determining a frequency range of the first signal part by sequentially applying the signal branches of the detector unit to the power detector to evaluate a power of the first signal part;
detecting noise by comparing a power on a band-specific applied signal path, which has a bandpass filter for useful signals, with a power on an applied signal path which supports both the useful signals and the noise to be detected;
adjusting the signal routing for the second signal part in the amplification unit based on the frequency range determined by the detector unit, wherein adjusting the signal routing for the second signal part in the amplification unit comprises switching signal paths having one or more amplifiers designed for the determined frequency range; and
amplifying at least the second signal part with the amplification unit.

2. The method of claim 1, wherein the transmission signal from the terminal is received via a radio interface or via a cable.

3. The method of claim 1, wherein the dividing of the transmission signal divides a transmission signal power using at least one directional coupler or switch.

4. The method of claim 1, wherein the first signal part of the transmission signal of the terminal has a lower power than the second signal part.

5. The method of claim 1, wherein the determined frequency range corresponds to a frequency range of a radio standard, in particular a mobile radio standard and/or a standard for local wireless networks.

6. The method of claim 1, wherein the determining the frequency range of the first signal part is carried out continuously or started on the basis of a triggering event.

7. The method of claim 6, wherein the signal branches of the detector unit designed for different frequency ranges each include an amplifier configured for a specific frequency range.

8. The method of claim 1, wherein the determining the frequency range of the first signal part comprises comparing to a threshold power the signal power of at least one of the signals applied sequentially to the power detector.

9. The method of claim 8, wherein the determining the frequency range of the first signal part comprises comparing the signal power of a first one of the signals applied sequentially to the power detector with a second one of the signals applied sequentially to the power detector.

10. The method of claim 8, wherein the signals applied sequentially to the power detector are each converted into a direct current (DC) voltage, and the comparison is made using the converted voltages.

11. The method of claim 1, wherein adjusting the signal routing for the second signal part in the amplification unit comprises switching the signal branches having one or more amplifiers designed for the determined frequency range.

12. The method of claim 11, wherein signals received from the antenna or at the antenna connection are amplified by the amplification unit.

13. The method of claim 12, wherein the amplification of at least the second signal part by the amplification unit is designed such that an attenuation of the signal transmission between the terminal and the antenna or the antenna connection is compensated.

14. The method of claim 1, further comprising adjusting the signal amplification for the second signal part in the amplification unit based on the power determined by the detector unit.

15. A method for amplifying radio signals between a terminal and an antenna or an antenna connection by a circuit, having an amplification unit and a detector unit which has signal branches designed for different frequency ranges, and a power detector, the method comprising:
  receiving a transmission signal from the terminal;
  dividing the transmission signal power of the transmission signal into at least a first signal part and a second signal part;
  applying the first signal part to the signal branches of the detector unit;
  determining a frequency range of the first signal part by applying the signal branches of the detector unit to the power detector in time sequence to evaluate a power of the first signal part;
  adjusting the signal routing for the second signal part in the amplification unit based on the frequency range determined by the detector unit, wherein adjusting the signal routing for the second signal part in the amplification unit comprises switching signal paths having one or more amplifiers designed for the determined frequency range, wherein after adjusting of the signal routing for the second signal part in the amplification unit and during amplification of at least the second signal part by the amplification unit by:
  receiving a further transmission signal from the terminal;
  dividing the further transmission signal into at least a first further signal part and a second further signal part;
  applying the first further signal part to the signal branches of the detector unit; and
  determining a frequency range of the first further signal part by sequentially applying the signal branches of the detector unit to the power detector to evaluate a power of the first further signal part.

16. The method of claim 15, wherein the sequential application of the signal branches of the detector unit is carried out by switching the signal branches of the detector unit to the power detector.

17. A circuit for amplifying radio signals between a terminal and an antenna or an antenna connection, the circuit comprising:
  a transmission unit configured to receive a transmission signal from the terminal;
  a signal splitting unit configured to divide the transmission signal into at least a first signal part and a second signal part;
  a detector unit, that comprises signal branches designed for different frequency ranges and a power detector, and is configured to apply the first signal part to the signal branches of the detector unit and to determine a frequency range of the first signal part by applying the signal branches of the detector unit to the power detector in time sequence to evaluate a power of the first signal part and further configured to detect noise by comparing a power on a band-specific applied signal path, which has a bandpass filter for useful signals, with a power on an applied signal path which supports both the useful signals and the noise to be detected;
  an amplification unit configured to amplify at least the second signal part; and
  a control unit configured to adjust the signal routing for the second signal part in the amplification unit based on the frequency range determined by the detector unit, wherein, in operation, the adjusting the signal routing for the second signal part in the amplification unit comprises switching signal paths having one or more amplifiers designed for the determined frequency range.

* * * * *